Patented Jan. 6, 1925.

1,521,739

UNITED STATES PATENT OFFICE.

MORRIS L. WEISS, OF BELMAR, NEW JERSEY, ASSIGNOR TO DOVAN CHEMICAL CORPORATION, OF WILMINGTON, DELAWARE, A CORPORATION OF DELAWARE.

RUBBER VULCANIZATION.

No Drawing.   Application filed June 13, 1924.   Serial No. 719,736.

*To all whom it may concern:*

Be it known that I, MORRIS L. WEISS, a citizen of the United States, residing at Belmar, county of Monmouth, State of New Jersey, have invented certain new and useful Improvements in Rubber Vulcanization, of which the following is a full, clear, concise, and exact description.

My invention relates to the process of vulcanizing rubber and similar vulcanizable gums, and particularly to the ingredients used therein to produce rubber goods having increased wearing qualities and tensile strength and also to facilitate the control of the vulcanizing action as well as to shorten the time required for vulcanization.

In my prior Patent No. 1,411,231 issued March 28, 1922, for "vulcanization accelerator," I have described and claimed a substance known as diphenylguanidine which when used in rubber vulcanization greatly improves the elasticity, tensile strength and aging qualities of rubber, in addition to materially shortening the time required for applying the vulcanizing heat, as well as reducing the temperature of the latter.

Subsequent to the issue of said patent, the diphenylguanidine salt of phenyl dithiocarbamic acid and other diphenylguanidine salts apparently have been considered by several rubber chemists and mentioned in the literature. In an article published in Industrial and Engineering Chemistry for March 1923 (p. 286) Winfield Scott has considered such salts and he gives several observations as to the characteristics of the diphenylguanidine salt of phenyldithiocarbamic acid. However, said article does not suggest the use of guanidine salts of disubstituted dithiocarbamic acid which are stable and are much more efficacious as accelerators than the diphenylguanidine salt of the phenyldithiocarbamic acid suggested whose accelerative value was not discussed or commented upon and which I have found to be of very little, if any, value as an accelerator.

I am also aware of United States Patent No. 1,126,469 issued January 26, 1915 on the application of Fritz Hofmann and Kurt Gottlob which describes and claims certain organic accelerators including piperidin, piperidyldithiocarbamate of piperidin and benzaldipiperyl.

Patent No. 1,386,153 issued August 2, 1921, on the application of G. Bruni describes and claims an accelerator which comprises the use of metallic salts of dithiocarbamic acid. These accelerators have a low critical temperature and are more liable to scorch in milling than the accelerator herein described and claimed and the use of such accelerators is accompanied by certain other disadvantages well known to practical rubber manufacturers, which are not necessary to set forth here.

The object of the present invention is to provide an accelerator that will have a convenient and desirable critical temperature. By the term "critical temperature" is meant the temperature at which the material will best perform its function as an accelerator or vitalizer during vulcanization.

It is well known that diphenylguanidine, referred to above and now one of the most widely used organic accelerators in vulcanization, has a comparatively high critical temperature and therefore in vulcanizing thick masses of rubber special procedure has usually been necessary in order to insure complete vulcanization of all of the interior portions of such masses. On the other hand certain other organic accelerators of vulcanization, such as the metallic dithiocarbamates, ammoniumdithiocarbamates and the metallic xanthates have too low critical temperatures, making the rubber compound liable to overcure or to become partially cured upon standing for short periods of time. Other disadvantages of those accelerators are that they permit vulcanization to take place at low or even room temperatures, and act much too rapidly at higher temperatures to permit of convenient practical handling of rubber stocks, prior to curing and without scorching or partial curing on the mills and calenders.

I have discovered that aromatic disubstituted guanidine dibenzyldithiocarbamates particularly, diphenylguanidine dibenzyldithiocarbamate, ditolylguanidine dibenzyldithiocarbamate, phenyltolylguanidine diben zyldithiocarbamate and phenylxylylguanidine dibenzyldithiocarbamate are very efficacious as accelerators or vitalizers, because they possess critical temperatures which are low enough to permit complete vulcanization of thick masses of rubber and yet not so low as to cause vulcanization of the properly compounded rubber stocks during milling or while being stored pior to being vulcanized.

Furthermore, if it be desired to use my improved accelerators at the normal curing temperature corresponding to forty pounds of steam pressure this may be done very satisfactorily by reducing the amount of the accelerator to as low as two tenths of one per cent of the rubber content with highly satisfactory results.

The resulting vulcanized rubber product possesses remarkable high tensile strength, elasticity, freedom from bloom, good aging qualities and especially possesses a very high resistance to abrasion. These features make the rubber produced by the use of my improved accelerator very advantageous when used in the manufacture of automobile tires and similar rubber goods subject to unusually heavy wear.

My improved accelerator does not discolor the rubber, nor does it impart to the rubber any objectionable odor or give off any poisonous or offensive gases. It is a purely organic salt and readily dissolves in the rubber mix. It has a melting point of about 140° C. and is perfectly stable at temperatures up to that melting point. It is crystalline in form and can be ground to a fine powder which makes it very desirable in compounding rubber by modern methods now practiced.

One method of making my improved accelerator is to mix in molecular quantities dibenzylamine, carbon bisulphide and diphenylguanidine in a suitable organic solvent such as carbon disulphide, alcohol, acetone, etc., and causing the reaction product to crystallize out. The reactions involved are as follows:

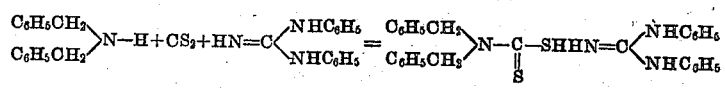

Another method of making my improved accelerator is to mix in molecular quantities, in water as a solvent, dibenzylamine, carbon bisulphide and caustic soda. The resulting aqueous solution of sodium dibenzyldithiocarbamate is then poured into an aqueous solution of diphenylguanidine hydrochloride and the resulting product filtered out and dried. These reactions are as follows, the first reaction being:

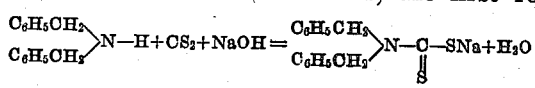

and upon combining the latter with a solution of diphenylguanidine hydrochloride the reaction is:

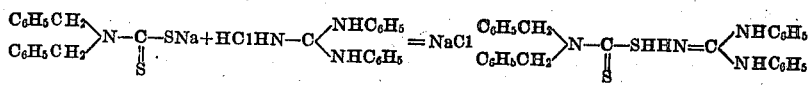

As examples of the curing effects of my improved accelerator the following characteristic mixes are given: first latex rubber, 100 parts by weight; zinc oxide 50 parts; sulphur, 3 parts; accelerator, 0.5 part.

This compound when cured for 7½ minutes at 20 lbs. steam pressure gives a tensile strength of approximately 4000 lbs. per square inch. When the same compound is cured for the same time but at a temperature corresponding to 40 lbs. steam pressure the tensile strength is somewhat higher thus showing that in addition to a very high tensile strength being obtained at 20 lbs. steam pressure, there was no over cure at 40 lbs. steam pressure.

Furthermore when the amount of the accelerator was reduced to .2 of one part in the above formula and the compound cured for one-half hour at 40 lbs. steam pressure, excellent tensile strength was obtained, which was nearly equal to that above mentioned.

It will therefore be appreciated that the use of my improved accelerator or vitalizer permits of the use of a very flexible range of curing pressures and times of cure without danger of over curing and in addition thereto the curing power of the material is sufficiently rapid to be very economical, while at the same time the danger of preliminary partial curing or over-curing by carelessness in departing from the prescribed times and steam pressures are practically eliminated. The unusually high tensile strength and excellent wearing qualities resulting are also great advantages.

Having thus described the above embodiments of my invention, I do not wish to be understood as being limited to the details of procedure or to the specific proportions or ingredients set forth for various adaptations of the invention may be made by those skilled in the art without departing from the spirit and scope of my invention.

What I claim and desire to protect by Letters Patent is:

1. A vulcanized compound of rubber or similar material, having as an ingredient before vulcanization an aromatic disubstituted guanidine dibenzyldithiocarbamate.

2. A vulcanized compound of rubber or similar material, having as an ingredient before vulcanization, diphenylguanidine dibenzyldithiocarbamate.

3. A vulcanized compound of rubber or similar material, having as ingredients before vulcanization a vulcanizing agent and an aromatic disubstituted guanidine dibenzyldithiocarbamate.

4. A vulcanized compound of rubber or similar material, having as ingredients before vulcanization, a vulcanizing agent and diphenylguanidine dibenzyldithiocarbamate.

5. The process of vulcanizing rubber or similar material, which comprises combining with a rubber compound an aromatic disubstituted guanidine dibenzyldithiocarbamate.

6. The process of vulcanizing rubber or similar material which comprises combining with a rubber compound diphenylguanidine dibenzyldithiocarbamate.

7. The process of vulcanizing rubber or similar material which comprises combining with a rubber compound a vulcanizing agent and an accelerator comprising an aromatic disubstituted guanidine dibenzyldithiocarbamate.

8. The process of vulcanizing rubber or similar material which comprises combining with a rubber compound, a vulcanizing agent and an accelerator comprising diphenylguanidine dibenzyldithiocarbamate.

Signed this 11th day of June, 1924.

MORRIS L. WEISS.